(12) United States Patent
Sobel et al.

(10) Patent No.: US 9,154,466 B2
(45) Date of Patent: Oct. 6, 2015

(54) SYSTEMS AND METHODS FOR INTRODUCING VARIATION IN SUB-SYSTEM OUTPUT SIGNALS TO PREVENT DEVICE FINGERPRINTING

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/139,824

(22) Filed: Dec. 23, 2013

(65) Prior Publication Data

US 2015/0180834 A1     Jun. 25, 2015

(51) Int. Cl.
*H04L 29/06*     (2006.01)
*H04W 12/06*     (2009.01)

(52) U.S. Cl.
CPC ........... *H04L 63/0421* (2013.01); *H04W 12/06* (2013.01); *H04L 63/1441* (2013.01)

(58) Field of Classification Search
CPC ..... H04W 12/06; H04L 63/1425; G06F 21/55
USPC ................................ 380/1; 726/1, 4; 713/151
See application file for complete search history.

(56) References Cited

U.S. PATENT DOCUMENTS

| | | | |
|---|---|---|---|
| 2006/0164282 A1* | 7/2006 | Duff et al. | 342/14 |
| 2013/0102283 A1* | 4/2013 | Lau et al. | 455/411 |
| 2013/0104203 A1* | 4/2013 | Davis et al. | 726/5 |

OTHER PUBLICATIONS

Frankin et al. Passive Data Link Layer 802.11 Wireless Device Driver Fingerprinting, Aug. 2006, USENIX security '06, pp. 1-12.*
Beresford, Alastair R., et al., "MockDroid: trading privacy application functionality on smartphones", Proceedings of the 12th Workshop on Mobile Computing Systems and Applications, HotMobile '11, Phoenix, Arizona, (Mar. 1-3, 2011).
"SensorSimulator", https://code.google.com/p/openintents/wiki/SensorSimulator, (Jan. 12, 2013).
"School of Privacy, Guide on How to be Safe, Secure and Protect Your Online Anonymity", http://school-of-privacy.com/post/70381068300/fake-gps-location-andoid, (Dec. 18, 2013).
Bruce McCorkendale, et al; Systems and Methods for Constructing a Volumetric Model of a Space from a Constellation of Sensing Devices; U.S. Appl. No. 14/833,655, filed Aug. 24, 2015.
"openHAB", http://www.openhab.org/, as accessed Jun. 25, 2015, (Jul. 11, 2011).
"Open Mobile Alliance (OMA)", http://openmobilealliance.org/, as accessed Jun. 25, 2015, (Aug. 2, 2002).
Kotis, Konstantinos et al., "An ontology for the automated deployment of applications in heterogeneous IoT environments", http://www.semantic-web-journal.net/sites/default/files/swj247_0.pdf, as accessed Jun. 25, 2015, Semantic Web Journal, (Feb. 13, 2012).
Treacy, Megan, "10 environmental sensors that go along with you", http://www.treehugger.com/clean-technology/environmental-sensors.html, as accessed Jun. 25, 2015, (Mar. 5, 2013).
"OMA Device Management", http://openmobilealliance.org/about-oma/work-program/device-management/, as accessed Jun. 25, 2015, (Jan. 15, 2013).

* cited by examiner

*Primary Examiner* — Dao Ho
(74) *Attorney, Agent, or Firm* — ALG Intellectual Property, LLC

(57) ABSTRACT

A computer-implemented method for introducing variation in sub-system output signals to prevent device fingerprinting may include (1) intercepting, on a computing device, an output signal sent from a sub-system device on a computing device to a software component on the computing device, (2) identifying a margin of error for the output signal, (3), creating a modified output signal by introducing variation into the output signal in such a way that (a) the variation does not exceed the margin of error for the output signal and (b) the modified output signal cannot be used to identify the computing device, and (4) sending the modified output signal to the software component. Various other methods, systems, and computer-readable media are also disclosed.

20 Claims, 6 Drawing Sheets

US 9,154,466 B2

SYSTEMS AND METHODS FOR INTRODUCING VARIATION IN SUB-SYSTEM OUTPUT SIGNALS TO PREVENT DEVICE FINGERPRINTING

BACKGROUND

Marketing and advertising groups (and other, more malicious parties) are continually interested in identifying new ways to track computing device users. While traditional privacy tools may provide users with some control over how they are tracked, recent research has shown that unwanted parties may be able to bypass these tools by fingerprinting a user's computing device based on unique characteristics associated with the device's sensor output.

For example, researchers have demonstrated that the various sensors present in many modern-day computing devices, such as the accelerometers, microphones, speakers, and radios often found in mobile phones, each generate unique and consistent inaccuracies in their outputs. These unique inaccuracies may, in turn, be used to create a profile or fingerprint of sorts for a computing device that can be used to uniquely identify and track the device and/or its user.

Unfortunately, traditional privacy software and privacy settings may be unable to prevent this kind of tracking. For example, as opposed to web-browser cookies, which users may be able to delete, block, and/or monitor, any sensor or hardware component on a computing device that outputs a signal unique to that computing device may potentially be used to fingerprint the computing device. These vulnerabilities may present serious privacy concerns to computing device vendors, developers, and users.

As such, the instant disclosure identifies and addresses a need for a more efficient and effective mechanism for preventing device fingerprinting based on sub-system output signals.

SUMMARY

As will be described in greater detail below, the instant disclosure generally relates to systems and methods for preventing device fingerprinting by introducing random variation in sub-system output signals. In one example, a computer-implemented method for performing such a task may include (1) intercepting, on a computing device, an output signal sent from a sub-system device on the computing device to a software component on the computing device, (2) identifying a margin of error for the output signal, (3) creating a modified output signal by introducing variation into the output signal in such a way that (a) the variation does not exceed the margin of error for the output signal and (b) the modified output signal cannot be used to identify the computing device, and then (4) sending the modified output signal to the software component.

In some examples, the modified output signal may be created using (1) a device driver for the sub-system device and/or (2) firmware for the sub-system device. In addition, the software component may be part of an application layer on the computing device. For example, the software component may include (1) an operating system component and/or (2) an application component.

In some embodiments, the margin of error for the output signal may include an upper limit and a lower limit. In these embodiments, the variation may be introduced in such a way that (1) the variation does not exceed the upper limit of the margin of error and (2) the variation does not exceed the lower limit of the margin of error. In at least one embodiment, creating the modified output signal may include introducing randomly generated variation into the output signal. In various examples, the sub-system device may include (1) a transducer, (2) a sensor, and/or (3) a radio transmitter.

According to some embodiments, a system for implementing the above-described method may include (1) an interception module, stored in memory, that intercepts, on a computing device, an output signal sent from a sub-system device on the computing device to a software component on the computing device, (2) an identification module, stored in memory, that identifies a margin of error for the output signal, (3) a modification module, stored in memory, that creates a modified output signal by introducing variation into the output signal in such a way that (a) the variation does not exceed the margin of error for the output signal and (b) the modified output signal cannot be used to identify the computing device, (4) a transmission module, stored in memory, that sends the modified output signal to the software component, and (5) at least one processor configured to execute the interception module, the identification module, the modification module, and the transmission module.

A corresponding computer-readable medium may include one or more computer-executable instructions that, when executed by at least one processor of a computing device, may cause the computing device to (1) intercept, on the computing device, an output signal sent from a sub-system device on the computing device to a software component on the computing device, (2) identify a margin of error for the output signal, (3) create a modified output signal by introducing variation into the output signal in such a way that (a) the variation does not exceed the margin of error for the output signal and (b) the modified output signal cannot be used to identify the computing device, and (4) send the modified output signal to the software component.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
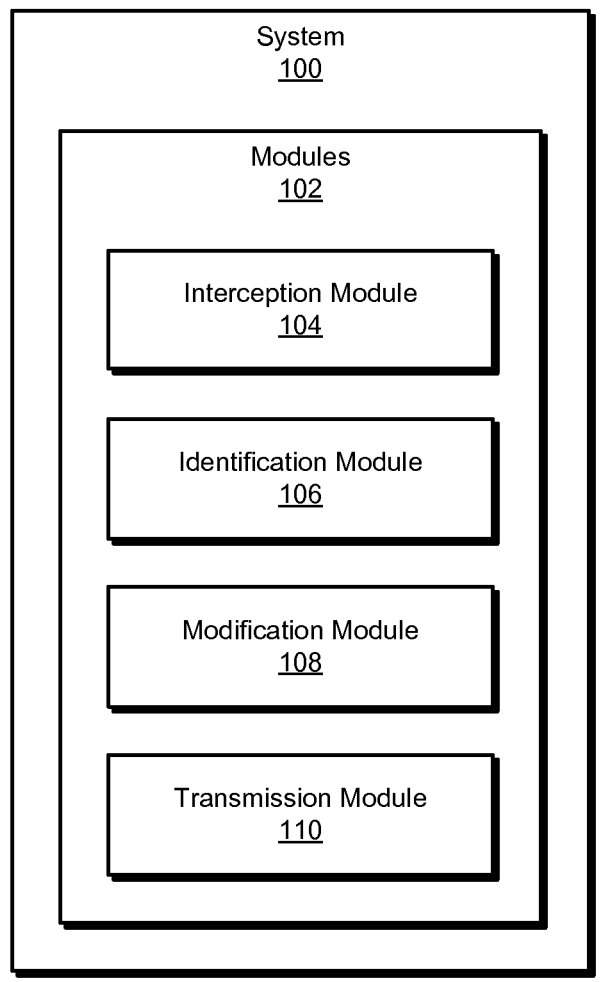
FIG. 1 is a block diagram of an exemplary system for introducing variation in sub-system output signals to prevent device fingerprinting.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for introducing variation in sub-system output signals to prevent device fingerprinting. As will be explained in greater detail below, by introducing variation into output signals sent from sub-system devices, the systems and methods described herein may prevent unwanted parties from using sub-system device output signals to fingerprint computing devices. This may in turn allow computing device vendors and software developers to create devices and services that are protected from tracking mechanisms designed to bypass traditional privacy settings. In addition, vendors who provide their users greater control over privacy may increase their users' satisfaction, loyalty, and patronage.

Figure 2:
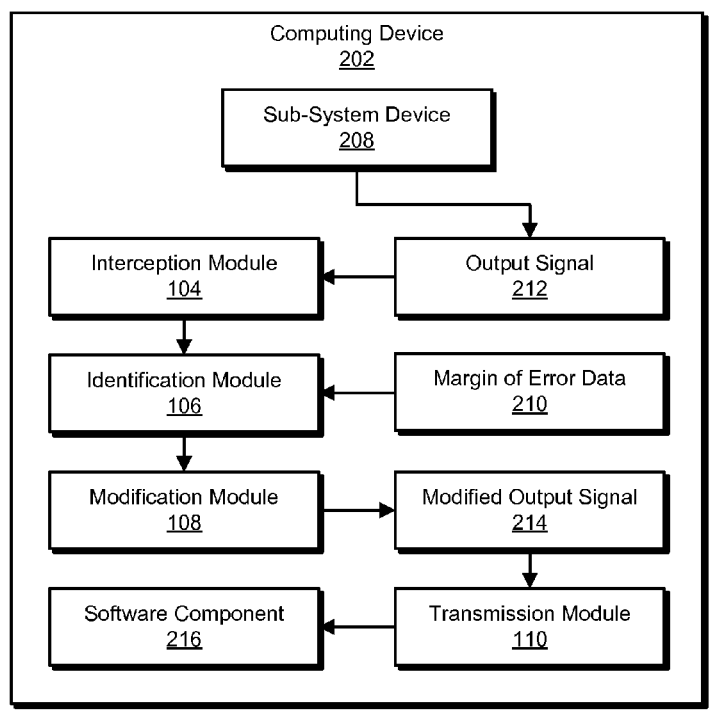
FIG. 2 is a block diagram of an additional exemplary system for introducing variation in sub-system output signals to prevent device fingerprinting.

The following will provide, with reference to FIGS. 1-2, detailed descriptions of exemplary systems for introducing variation in sub-system output signals to prevent device fingerprinting. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for introducing variation in sub-system output signals to prevent device fingerprinting. As illustrated in this figure, exemplary system 100 may include one or more modules 102 for performing one or more tasks. For example, and as will be explained in greater detail below, exemplary system 100 may include an interception module 104 that intercepts, on a computing device, an output signal sent from a sub-system device on the computing device to a software component on the computing device. Exemplary system 100 may also include an identification module 106 that identifies a margin of error for the output signal.

In addition, exemplary system 100 may include a modification module 108 that creates a modified output signal by introducing variation into the output signal in such a way that (1) the variation does not exceed the margin of error for the output signal and (2) the modified output signal cannot be used to identify the computing device. Exemplary system 100 may also include a transmission module 110 that sends the modified output signal to the software component. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, smartphone 406 in FIG. 4, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 programmed with all or a portion of modules 102.

In one embodiment, one or more of modules 102 from FIG. 1 may, when executed by at least one processor of computing device 202, enable computing device 202 to prevent an unwanted party from using a sub-system output signal on computing device 202 to fingerprint computing device 202. For example, and as will be described in greater detail below, interception module 104 may cause computing device 202 to intercept, on computing device 202, an output signal 212 sent from sub-system device 208 to software component 216. Identification module 106 may then cause computing device 202 to identify a margin of error contained within margin of error data 210. Modification module 108 may then cause computing device 202 to create a modified output signal 214 by introducing variation into output signal 212 in such a way that (1) the variation does not exceed the margin of error for output signal 212 and (2) modified output signal 214 cannot be used to identify computing device 202. Finally, transmission module 110 may send modified output signal 214 to software component 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary smartphone 406 in FIG. 4, exemplary computing system 510 in FIG. 5, or any other suitable computing device.

Figure 3:
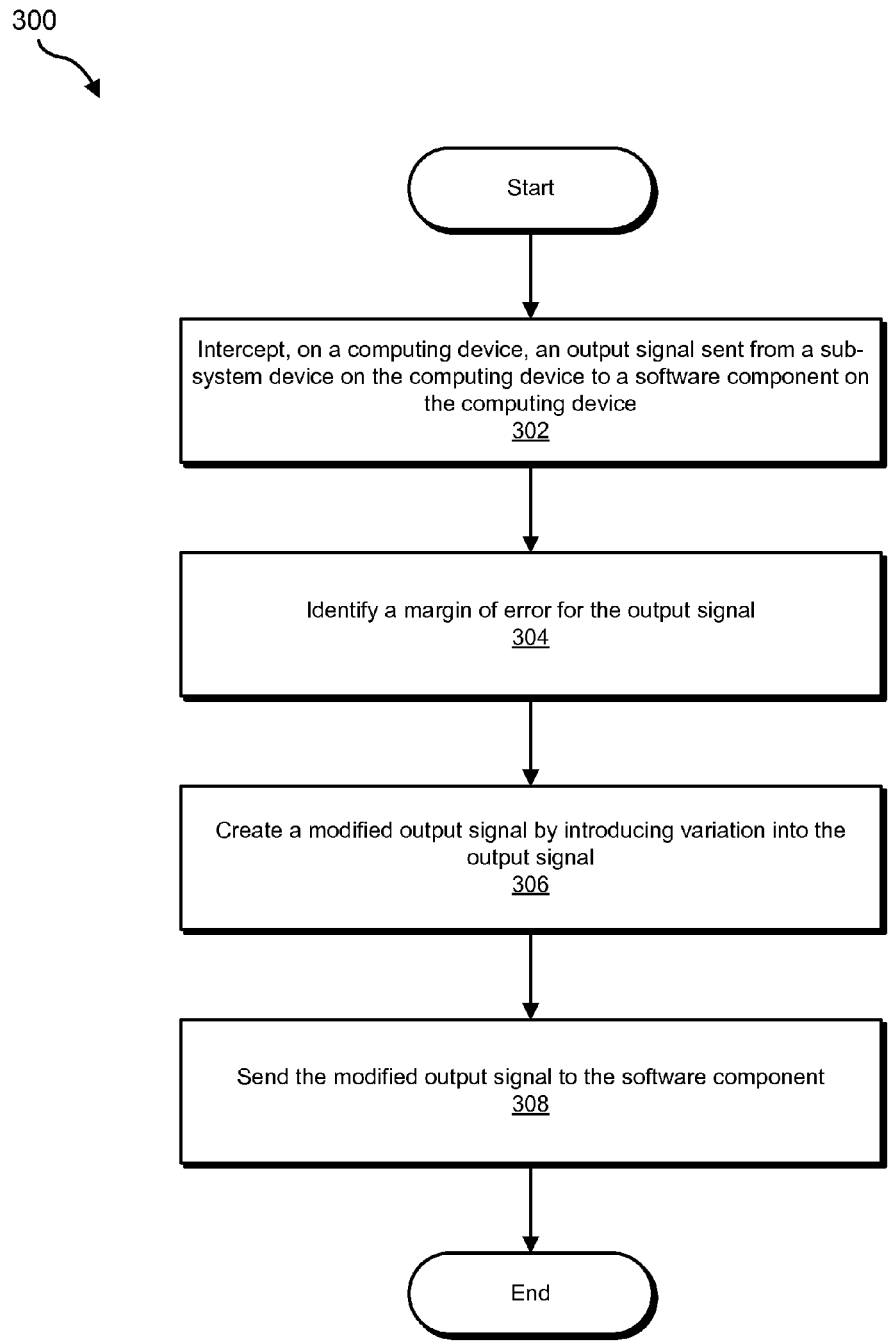
FIG. 3 is a flow diagram of an exemplary method for introducing variation in sub-system output signals to prevent device fingerprinting.

FIG. 3 is a flow diagram of an exemplary computer-implemented method 300 for introducing variation in sub-system output signals to prevent device fingerprinting. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, smartphone 406 in FIG. 4, computing system 510 in FIG. 5, and/or portions of exemplary network architecture 600 in FIG. 6.

As illustrated in FIG. 3, at step 302 one or more of the systems described herein may intercept, on a computing device, an output signal sent from a sub-system device on the computing device to a software component on the computing device. For example, interception module 104 may, as part of computing device 202 in FIG. 2, intercept, on computing device 202, an output signal 212 sent from sub-system device 208 to software component 216.

As used herein, the phrase "output signal" generally refers to any type or form of information and/or pattern (digital or analog) that may be created, sent, and/or produced by sub-system devices within a computing device. For example, a radio transmitter on a smartphone may produce a radio output signal. Similarly, a collection of hardware components on a computing device may introduce a unique pattern of electromagnetic interference within a circuit on the computing device, and that pattern of interference may be considered an "output signal".

In some embodiments, output signals may include signals transmitted by sensors on a computing device. For example, any type or form of output transmitted by an accelerometer, microphone, speaker, etc. may represent an output signal. Output signals may also include any type or form of sound and/or vibration produced by a computing device, such as sounds produced by speakers on a computing device or vibration caused by motors in the computing device. For example, the frequency response from a microphone that is recording and/or receiving sounds and vibrations on a computing device may be considered an output signal.

An output signal may also include any type or form of information, signal, and/or data transmitted and/or produced by a computing device that can be received by another hardware device or software component. For example, an electrical signal produced by a sub-system device (such as a microphone) on a computing device may represent an output signal. In another example, an output signal may include a detectable pattern of small voltage fluctuations within a computing circuit. Other examples of output signals include, without limitation, radio signals (produced, e.g., by a radio transmitter on a cell phone), sensor and transducer readings (e.g., accelerometer, compass, gyroscope, speaker, microphone, etc. signals and output), processor and microprocessor output signals, and/or any other type or form of signal, transmission, and/or output sent from or created by a computing device.

As used herein, the phrase "sub-system device" generally refers to any type or form of physical hardware and/or corresponding firmware on a computing device. For example, a sub-system device may include any type or form of physical device, sensor, component, attachment, etc., that is physically connected to and/or part of a computing device. In some embodiments, a sub-system device may include a collection of hardware components and/or corresponding firmware configured to perform a function, such as a collection of hardware components and firmware that function as an accelerometer. In addition, a sub-system device may include any physical hardware and/or corresponding firmware that operates at the physical layer of a computing device (or, in the case of a virtual machine, an emulated physical layer) and/or that is accessed by software running in an application layer of the computing device. A sub-system device may also include software configured to emulate a physical device, such as emulated physical devices within a virtual machine.

Sub-system devices may also include any type or form of physical hardware and/or corresponding firmware capable of transmitting, producing, and/or sending an output signal, such as any of the output signals described above. For example, a sub-system device may include a sensor on a computing device, such as those found in smartphones (e.g., an accelerometer, gyroscope, etc.). Examples of sub-system devices include, without limitation, transducers and sensors (e.g., microphones, speakers, accelerometers, gyroscopes, altimeters, thermometers, compasses, touchscreens, fingerprint readers, heart-rate monitors, retinal scanners, etc.), radio transmitters (e.g., mobile phone radios, BLUETOOTH radios, WIFI radios, Global Positioning System (GPS) radios, etc.), optical sensors and devices (e.g., cameras), processors, memory, and other circuit board components, hardware controllers, and/or any other type or form of computing device sensor, component, and/or hardware.

As used herein, the phrase "software component" generally refers to a collection of computer-executable instructions that work together to perform a specific function. For example, a software component may include computer-executable instructions that receive, process, transfer, translate, read, transmit, and/or send an output signal. Examples of software components include, without limitation, operating system components (e.g., device drivers, kernels, applications, system registries, system processes, etc.), application components (i.e., any part or process of an application), and any other type or form of software component.

For example, a software component may include a device driver within an operating system configured to access and/or control a hardware device. In another example, a software component may include a voice chat application that receives output signals from microphone drivers. A software component may also include an Application Programming Interface (API) used to access and/or control physical devices, firmware, or software.

The systems described herein may perform step 302 in a variety of ways. In one example, interception module 104 may be included within firmware that is used to access and/or control sub-system device 208. In this example, interception module 104 may intercept output signal 212 as it is processed by and/or passed through the firmware for sub-system device 208. In another example, interception module 104 may be part of a device driver configured to receive and process output signals sent from sub-system device 208. In this example, interception module 104 may intercept output signal 212 as it is processed by the device driver after being sent to the device driver by sub-system device 208.

As illustrated in FIG. 3, at step 304 the systems described herein may identify a margin of error for the output signal. For example, identification module 106 may, as part of computing device 202 in FIG. 2, identify a margin of error for output signal 212 within margin of error data 210.

The phrase "margin of error," as used herein, generally refers to an acceptable limit of inaccuracy. For example, a margin of error for an output signal may be an acceptable limit of inaccuracy for the output signal. A margin of error may be defined arbitrarily (by, e.g., users or developers), by hardware limitations, by manufacturer specifications, by application settings, by device drivers, by firmware, by operating systems, and/or by any other suitable mechanism, person, and/or process.

In some embodiments, the margin of error may include an upper and lower limit. For example, in an ideal scenario, the accelerometer output of a smartphone at rest may be 1.0 (to account for the force of gravity). However, because of inevitable inaccuracies in accelerometer output, a developer may define a margin of error for the accelerometer output as anywhere between 1.5 to 0.5. As long as the accelerometer outputs a signal within this range, the accelerometer signal falls within the margin of error. If, however, the accelerometer outputs a signal that is above 1.5 or below 0.5, the accelerometer exceeds the margin of error.

The systems and methods described herein may perform step 304 in a variety of ways. For example, margin of error data 210 may be data included with, set by, and/or defined by the firmware for sub-system device 208. In this example, identification module 106 may obtain margin of error data 210 from the firmware for sub-system device 208. In some embodiments, identification module 106 may be part of the firmware for sub-system device 208 and therefore have access to margin of error data 210. In another example, margin of error data 210 may be included with, set by, and/or defined by a device driver for sub-system device 208. In this example, identification module 106 may obtain margin of error data 210 from the device driver for sub-system device 208. In some embodiments, identification module 106 may be part of the device driver for sub-system device 208 and therefore have access to margin of error data 210. Identification module 106 may also obtain margin of error data 210 from any other suitable software component, storage medium, and/or firmware.

As illustrated in FIG. 3, at step 306 the systems described herein may create a modified output signal by introducing variation into the output signal in such a way that (1) the variation does not exceed the margin of error for the output signal and (2) the modified output signal cannot be used to identify the computing device. For example, modification module 108 may, as part of computing device 202, create modified output signal 214 by introducing variation into output signal 212. In this example, modification module 108 may introduce variation into output signal 212 in such a way that (1) the variation does not exceed the margin of error identified by identification module 106 and (2) modified output signal 214 cannot be used to identify computing device 202.

As used herein, the phrase "modified output signal" generally refers to an output signal that has been altered in some form. For example, device drivers may pass a "raw" or unaltered output signal from a microphone to an application component that is using the microphone. In this example, modification module 108 may (e.g., as part of the device driver) apply various filters and modifications to the raw signal before passing the same to the application component, thus creating a modified output signal (i.e., a signal that has been altered from one form to another).

The systems described herein may modify an output signal at any time or place along the signal path. For example, modification module 108 may modify an output signal within the physical device that is creating the signal, within the firmware that is controlling the device, within the drivers that send the signal to an application layer, within an application and/or application process that receives output signals, and/or within any other suitable device and/or software component.

As used herein, the phrase "introducing variation" generally refers to any process that a device and/or software component (e.g., modification module 108) may use to modify an output signal. For example, the phrase "introducing variation" may refer to specific computer-executable instructions, algorithms, functions, and/or physical processes used by modification module 108 to modify output signal 212. For example, modification module 108 may cause computing device 202 to execute an algorithm that alters output signal 212 in such a way that output signal 212 does not exceed the margin of error identified by identification module 106. In some embodiments, modification module 108 may introduce variation into output signal 212 in such a way that modified output signal 214 has no statistically distinguishable fingerprint (i.e., modified output signal 214 cannot be used to, in any statistically significant way, track, identify, and/or fingerprint computing device 202).

The systems and methods described herein may perform step 306 in a variety of ways. For example, in embodiments where margin of error data 210 includes an upper and lower limit, modification module 108 may introduce variation into output signal 212 in such a way that the variation does not exceed the upper or lower limit as identified within margin of error data 210.

In some embodiments, modification module 108 may create modified output signal 214 by introducing randomly generated variation into the output signal. For example, modification module 108 may introduce randomly generated variation into output signal 212 in such a way that output signal 212 falls within the margin of error identified by identification module 106.

Modification module 108 may introduce randomly generated variation in a variety of ways. For example, modification module 108 may introduce randomly generated variation into output signal 212 within a device driver and/or firmware for sub-system device 208. In some embodiments (and as will be discussed in greater detail in connection with FIG. 4), modification module 108 may create modified output signal 214 in such a way that tracking programs designed to fingerprint computing devices cannot use modified output signal 214 to fingerprint computing device 202.

As illustrated in FIG. 3, at step 308 the systems described herein may send the modified output signal to the software component. For example, transmission module 110 may send modified output signal 214 to software component 216.

The systems and methods described herein may perform step 308 in a variety of ways. For example, transmission module 110 may send modified output signal 214 to an application after receiving a request from the application for the same. In another example, transmission module 110 may send output signal 212 to software component 216 by allowing the signal to pass through a device driver and/or device firmware for sub-system device 208. For example, an application may request to receive output signal 212 from sub-system device 208. In this example, output signal 212 may be intercepted and modified by a device driver, and transmission module 110 may, after output signal 212 has been modified, allow output signal 212 to reach the application.

In some embodiments, transmission module 110 may be configured to block output signal 212 from being sent to software component 216 if it determines that output signal 212 has not been properly modified, or that output signal 212 may potentially be used to fingerprint computing device 202. In some examples, software component 216 may be part of an application layer, such as an application layer of computing device 202. In these embodiments, transmission module 110 may send modified output signal 214 to a software component within the application layer of computing device 202.

Figure 4:
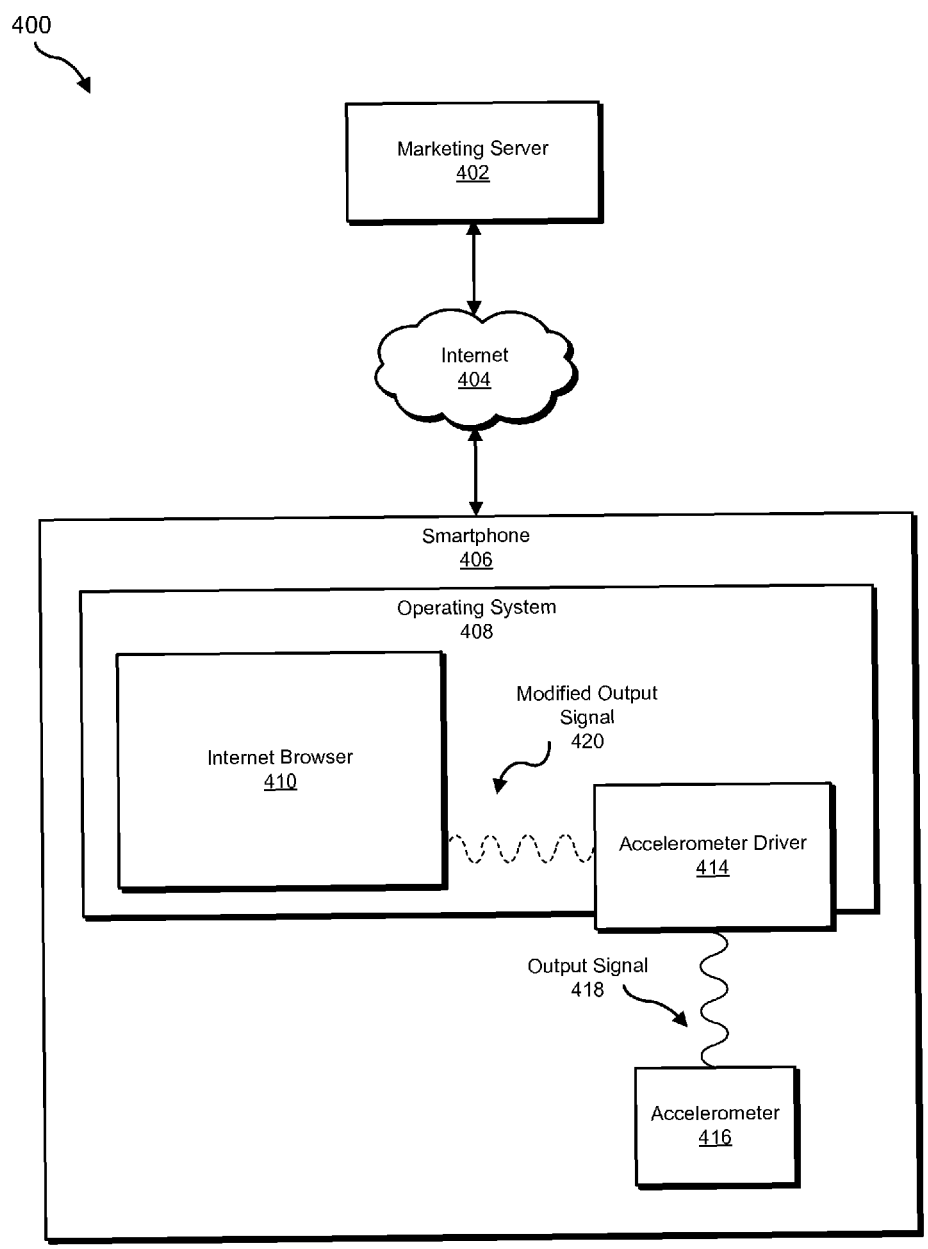
FIG. 4 is a block diagram of an exemplary smartphone configured to introduce variation in sub-system output signals to prevent device fingerprinting.
Figure 5:
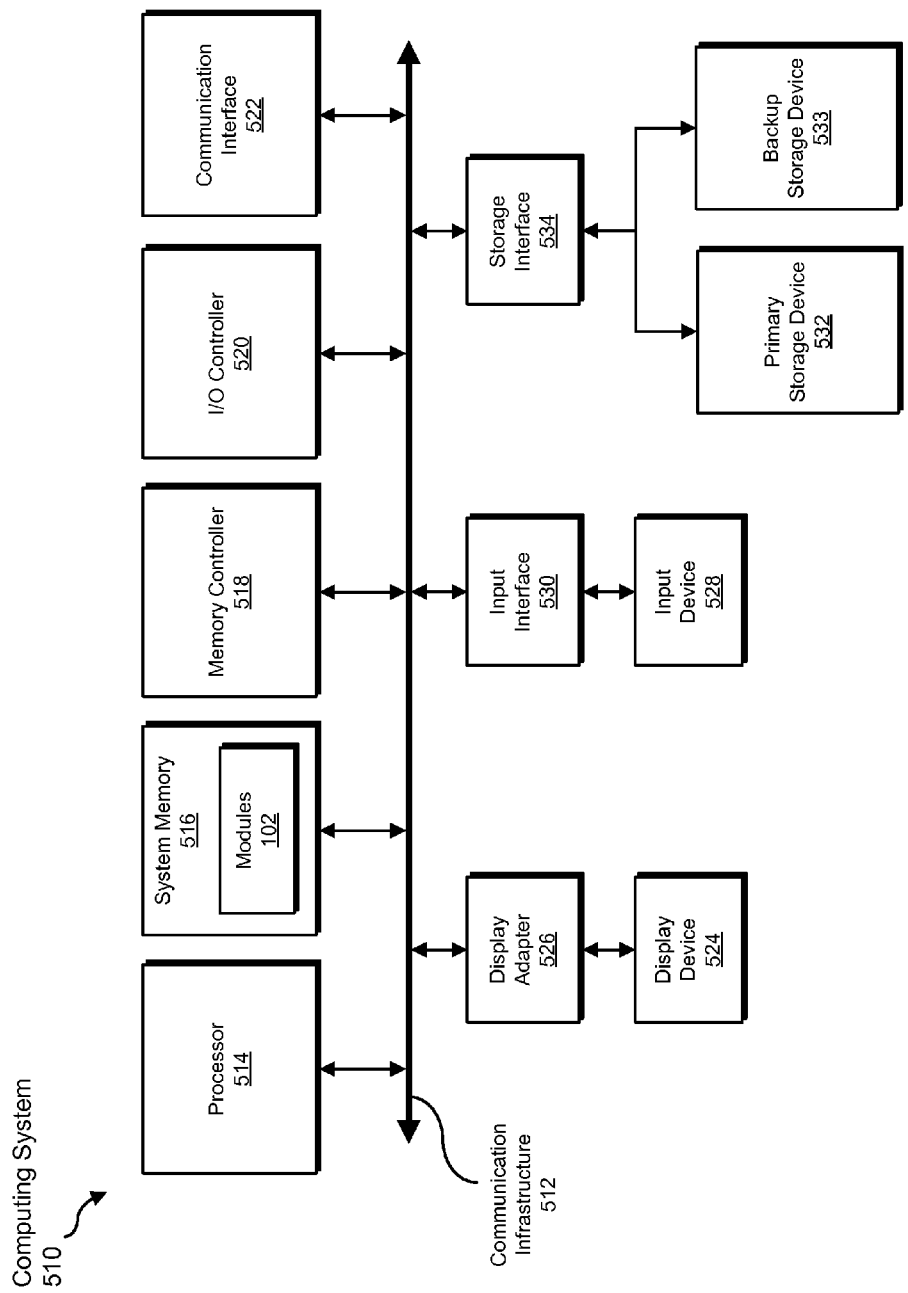
FIG. 5 is a block diagram of an exemplary computing system capable of implementing one or more of the embodiments described and/or illustrated herein.

FIG. 4 is a block diagram of a system 400 that illustrates how the systems and methods herein may prevent tracking programs (such as those that run within marketing servers) from using sub-system output signals to fingerprint computing devices (e.g., computing device 202 in FIG. 2, smartphone 406 in FIG. 4, and/or computing device 510 in FIG. 5). As illustrated in this figure, system 400 includes a marketing server 402, the Internet 404, and a smartphone 406. Smartphone 406 includes an accelerometer 416 and an operating system 408, on which is installed an internet browser 410 and an accelerometer driver 414. In this illustration, accelerometer driver 414 includes modules 102.

In this example, a user of smartphone 406 may use internet browser 410 to visit a web site hosted by marketing server 402. Marketing server 402 may then attempt to fingerprint smartphone 406 by requesting accelerometer data from internet browser 410. For the purposes of this illustration, marketing server 402 may attempt to fingerprint smartphones by detecting unique inaccuracies in accelerometer output signals. To prevent smartphone 406 from being fingerprinted, however, accelerometer driver 414 may first intercept and modify output signal 418. As detailed above, accelerometer driver 414 may create modified output signal 420 by introducing randomly generated variation into output signal 418. Upon creating modified output signal 420, accelerometer driver 414 may send output signal 420 to internet browser 410, which may in turn provide the same to marketing server 402.

As detailed above, accelerometer driver 414 may modify output signal 418 in such a way that marketing server 402 is unable to fingerprint smartphone 406. For example, marketing server 402 may be unable to detect any unique inaccuracies in the accelerometer data associated with smartphone 406 since modified output signal 420 has been "fuzzed" by the introduction of randomly generated variation. In addition, accelerometer driver 414 may be configured to introduce variation into output signal 418 in such a way that output signal 418 does not exceed a margin of error, thereby ensuring that modified output signal 420 remains accurate and useable.

As explained above in connection with method 300 in FIG. 3, advertisers are continually investigating new ways to track the buying habits of computing device users. As users become aware of how they are being tracked, they may want more privacy tools to prevent unwanted parties from monitoring their behaviors. While traditional privacy tools may allow users some control over how they are tracked, advertisers (and other, more malicious entities) may be able to bypass these tools by fingerprinting computing device sensor signals.

The instant disclosure may overcome this problem by "fuzzing" raw output signals sent from sensors and other sub-system devices before they are analyzed by tracking software. Specifically, by using a sensor driver or sensor firmware to introduce random variation into a sensor signal, the systems and methods described herein may create a modified sensor signal that has no statistically distinguishable fingerprint. This process may provide developers with an effective, robust, low-level solution for protecting their users' privacy.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
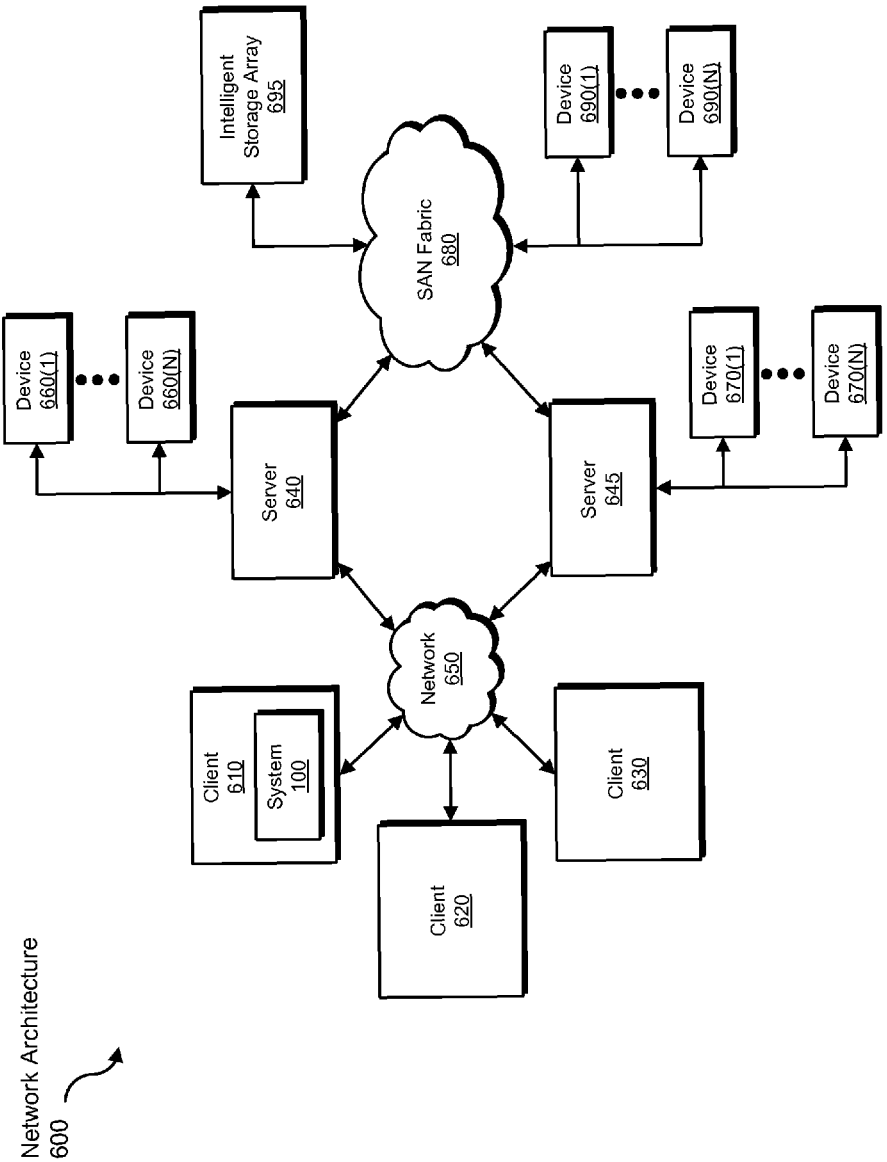
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for introducing variation in sub-system output signals to prevent device fingerprinting.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an output signal from a sub-system device and then transform the output signal into a modified output signal by introducing variation into the output signal. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for introducing variation in sub-system output signals to prevent device fingerprinting, at least a portion of the method being performed by a computing device comprising at least one processor, the method comprising:
   intercepting, on the computing device, an output signal sent from a sub-system device on the computing device to a software component on the computing device;
   identifying a margin of error for the output signal, the margin of error comprising an upper limit and a lower limit;
   creating a modified output signal by introducing randomly generated variation into the output signal within a device driver for the sub-system device and/or firmware for the sub-system device such that:
      the variation does not exceed the upper limit of the margin of error for the output signal;
      the variation does not exceed the lower limit of the margin of error for the output signal; and
      the modified output signal cannot be used to identify the computing device;
   sending the modified output signal to the software component.

2. The computer-implemented method of claim 1, wherein the margin of error is defined by at least one of:
   hardware limitations;
   manufacturer specifications;
   application settings.

3. The computer-implemented method of claim 1, wherein the software component is part of an application layer on the computing device.

4. The computer-implemented method of claim 1, wherein the software component comprises at least one of:
   an operating system component;
   an application component.

5. The computer-implemented method of claim 1, wherein the margin of error comprises data included with, set by, and/or defined by at least one of:
   the device driver for the sub-system device;
   the firmware for the sub-system device.

6. The computer implemented method of claim 1, wherein the sub-system device comprises at least one of:
   a transducer;
   a sensor;
   a radio transmitter.

7. The computer-implemented method of claim 1, wherein:
   the method further comprises determining that the output signal could potentially be used to fingerprint the computing device;
   intercepting the output signal comprises blocking the output signal from being sent to the software component in response to determining that the output signal could potentially be used to fingerprint the computing device.

8. A system for introducing variation in subsystem output signals to prevent device fingerprinting, the system comprising:
   an interception module, stored in memory, that intercepts, on a computing device, an output signal sent from a sub-system device on the computing device to a software component on the computing device;
   an identification module, stored in memory, that identifies a margin of error for the output signal, the margin of error comprising an upper limit and a lower limit;
   a modification module, stored in memory, that creates a modified output signal by introducing randomly generated variation into the output signal within a device driver for the sub-system device and/or firmware for the sub-system device such that:
  the variation does not exceed the upper limit of the margin of error for the output signal;
  the variation does not exceed the lower limit of the margin of error for the output signal; and
  the modified output signal cannot be used to identify the computing device;
a transmission module, stored in memory, that sends the modified output signal to the software component;
at least one hardware processor configured to execute the interception module, the identification module, the modification module, and the transmission module.

9. The system of claim 8, wherein the margin of error is defined by at least one of:
  hardware limitations;
  manufacturer specifications;
  application settings.

10. The system of claim 8, wherein the software component is part of an application layer on the computing device.

11. The system of claim 8, wherein the software component comprises at least one of:
  an operating system component;
  an application component.

12. The system of claim 8, wherein the margin of error comprises data included with, set by, and/or defined by at least one of:
  the device driver for the sub-system device;
  the firmware for the sub-system device.

13. The system of claim 8, wherein the sub-system device comprises at least one of:
  a transducer;
  a sensor;
  a radio transmitter.

14. The system of claim 8, wherein the transmission module sends the modified output signal to the software component by allowing the output signal to pass through the device driver and/or the firmware.

15. A non-transitory computer-readable-storage medium comprising one or more computer-executable instructions that, when executed by at least one processor of a computing device, cause the computing device to:
  intercept, on the computing device, an output signal sent from a sub-system device on the computing device to a software component on the computing device;
  identify a margin of error for the output signal, the margin of error comprising an upper limit and a lower limit;
  create a modified output signal by introducing randomly generated variation into the output signal within a device driver for the sub-system device and/or firmware for the sub-system device such that:
    the variation does not exceed the upper limit of the margin of error for the output signal;
    the variation does not exceed the lower limit of the margin of error for the output signal; and
    the modified output signal cannot be used to identify the computing device;
  send the modified output signal to the software component.

16. The non-transitory computer-readable-storage medium of claim 15, wherein the margin of error is defined by at least one of:
  hardware limitations;
  manufacturer specifications;
  application settings.

17. The non-transitory computer-readable-storage medium of claim 15, wherein the software component is part of an application layer on the computing device.

18. The non-transitory computer-readable-storage medium of claim 15, wherein the software component comprises at least one of:
  an operating system component;
  an application component.

19. The non-transitory computer-readable-storage medium of claim 15, wherein the margin of error comprises data included with, set by, and/or defined by at least one of:
  the device driver for the sub-system device;
  the firmware for the sub-system device.

20. The non-transitory computer-readable-storage medium of claim 15, wherein the software component comprises at least one of:
  an operating system component;
  an application component.

* * * * *